July 25, 1933.  E. S. JOHNSON  1,919,559
ELECTRIC BREAD TOASTER
Filed May 28, 1930  2 Sheets-Sheet 1
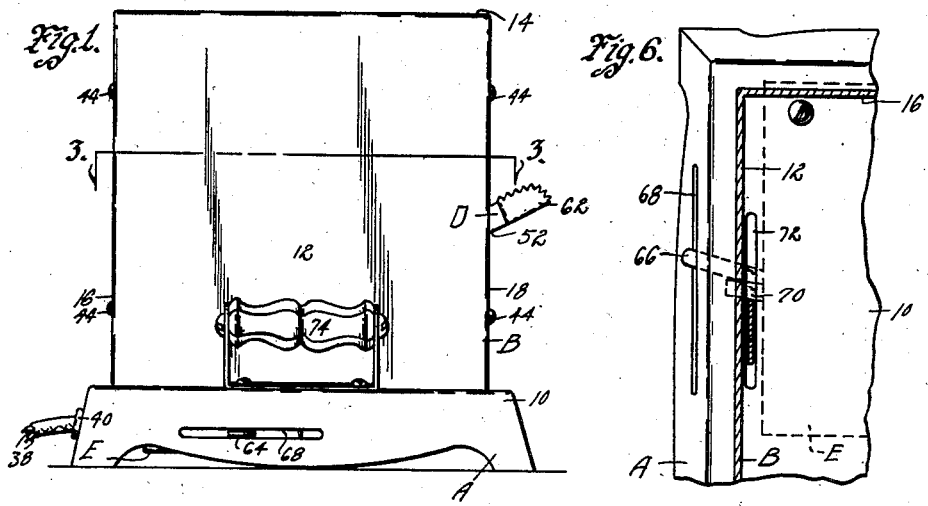

July 25, 1933.  E. S. JOHNSON  1,919,559
ELECTRIC BREAD TOASTER
Filed May 28, 1930  2 Sheets-Sheet 2
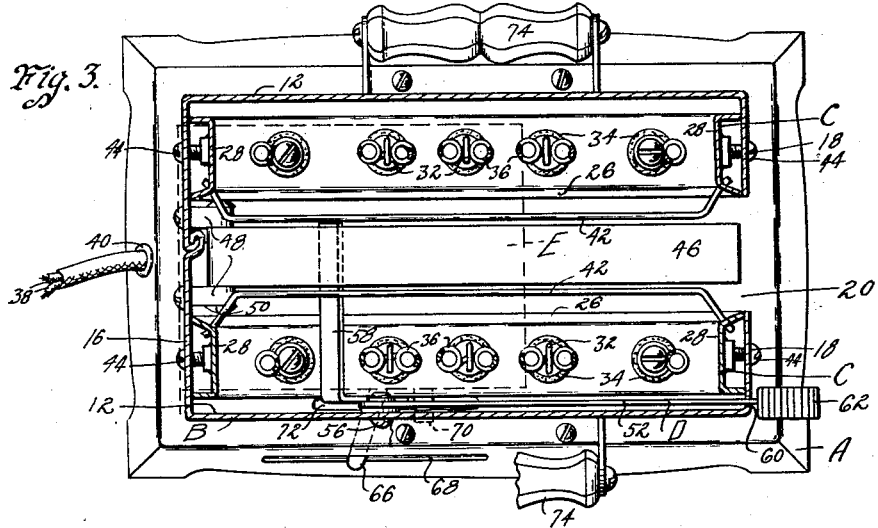
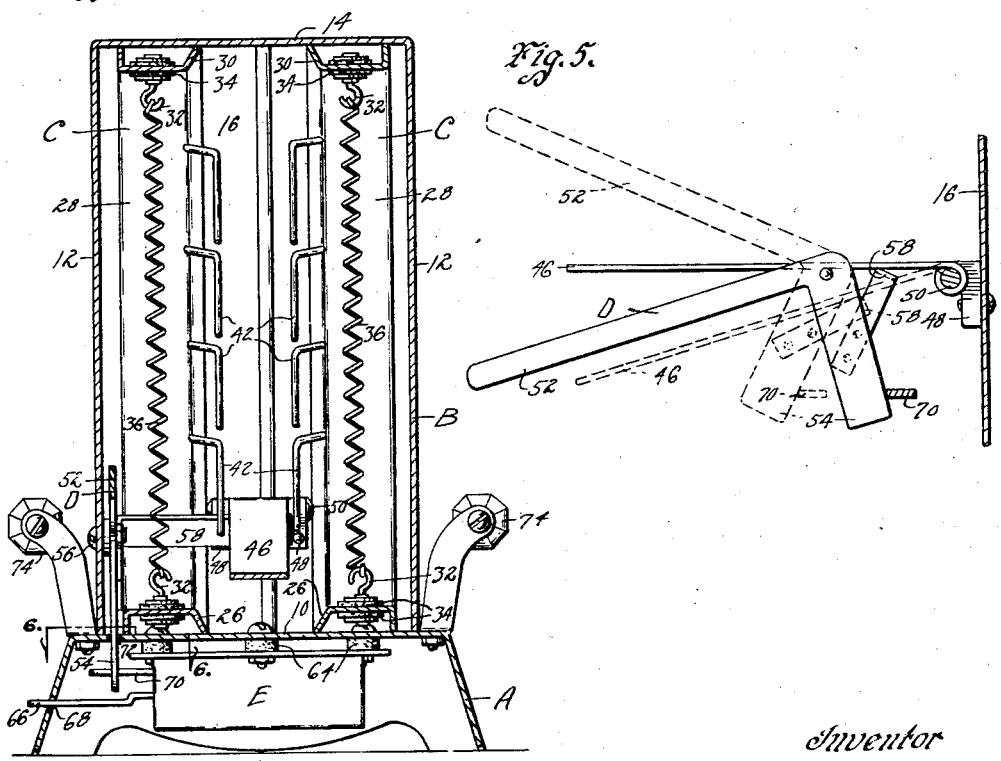
Inventor
Ernest S. Johnson
by Bair, Freeman & Sinclair
Attorneys
Witness
H. S. Munzenmaier Patented July 25, 1933

1,919,559

UNITED STATES PATENT OFFICE

ERNEST S. JOHNSON, OF WEBSTER CITY, IOWA, ASSIGNOR TO KNAPP-MONARCH COMPANY, OF WEBSTER CITY, IOWA, A CORPORATION OF MISSOURI

ELECTRIC BREAD TOASTER

Application filed May 28, 1930. Serial No. 456,527.

The object of my invention is to provide an electric bread toaster of simple, durable and comparatively inexpensive construction.

More particularly it is my purpose to provide an electric bread toaster wherein the bread, after it has been toasted, will automatically be ejected from the toaster itself.

A further object is to provide a support for a slice of bread normally arranged in horizontal position during the toasting operation and assuming an inclined position after completion of the toasting operation, for discharge of the slice of bread from the toaster.

A further object is to provide an automatic timing mechanism for controlling the duration of the interval which the slice of bread will remain in horizontal position.

Still another object is to provide a toaster wherein the bread may be removed from the toaster independent of the automatic operation thereof and in which the bread may be re-inserted within the toaster without effecting the automatic operation thereof.

A further object is to provide a toaster wherein the support for the slice of bread to be toasted moves to an inclined position after completion of the toasting operation and permits the bread to slide by gravity away from the toaster to a position where the heating means of the toaster will not affect the bread to be toasted.

With these and other objects in view my invention consists in the construction, arrangement and combination of the various parts of my device, whereby the objects contemplated are attained, as hereinafter more fully set forth, pointed out in my claims and illustrated in the accompanying drawings.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings in which:

Figure 1 is a side view of my improved automatic bread toaster.

Figure 2 is a central sectional view through the same.

Figure 3 is a horizontal sectional view taken on the line 3—3 of Figure 1.

Figure 4 is a vertical sectional view taken on the line 4—4 of Figure 2.

Figure 5 is a detail diagrammatic view illustrating the position of the bread support in solid lines for toasting operation, and in dotted lines for permitting the bread to slide from the toaster; and Figure 6 is a detail sectional view taken on the line 6—6 of Figure 4.

In the accompanying drawings I have used the reference character A to indicate generally a base and support. The support A is provided with a raised base 10 upon which a casing B is mounted. The casing B includes a pair of side walls 12 and a top wall 14. One end wall is completely closed as at 16 and the other end wall 18 is provided with an opening 20. It will thus be seen that I provide a casing closed on all sides and ends except the end 18, which is provided with an opening for permitting the slice of bread to be inserted within the toaster.

The casing B is provided with tongues or the like 22 which project through slots in the base 10 and are thereafter bent over for rigidly connecting the casing B to the base or support A. On each side of the opening 20 and within the casing B I provide a heating unit frame C. The frame C is channel shaped in cross section and is formed of a single piece of metal bent to provide a bottom 26, a pair of ends 28 and a top 30. Within the portions 26 and 30 of the frame C I mount a plurality of hooks 32, which are insulated from the frame C by washers 34 formed of insulating material. A heating element 36 is strung or fastened onto the hooks 32 in substantially the manner shown in Figure 2 of the drawings and the ends thereof are in contact with the electric supply wires 38. The wires 38 pass through a washer 40 mounted in the base A. The heating unit is substantially the same on each side of the opening 20.

Within the end portions 28 of the frame C

I mount a plurality of grid wires 42. The grid wires 42 are arranged on an angle inclined relative to horizontal and the purpose thereof will hereinafter be more fully set forth. The grid wires have their ends projecting through openings formed in the end portions 28 and are arranged to remain in fixed relationship relative to the frames C. The frames C are each held in position within the casing B by bolts or the like 44.

It will be noted that the grid wires 42 mounted in each frame C are spaced a slight distance apart so as to provide a space therebetween for receiving the slice of bread. The grid wires 42 are so arranged that a slice of bread may be inserted through the openings 20 in the casing and be received between the grid wires 42. In order to support a slice of bread to be toasted between the grid wires 42 I provide a bread support 46. The bread support 46 is pivotally connected to a bracket or the like 48. The bracket 48 is in turn mounted upon the end wall 16 of the casing B. The connection between the support 46 and the bracket 48 is accomplished by a pintle rod 50.

It will be noted that my support 46 is pivotally mounted and supported at only one end. The support 46 is free to move up and down between the grid wires 42. In order to retain the support 46 in horizontal position for supporting a slice of bread to be toasted, I provide a lever mechanism which I will now describe in detail.

Pivotally secured to one of the walls 12 of the casing A is a bell crank lever D having an operating part 52 and an actuating part 54. A bolt or the like 56 serves as the pivot point for the bell crank lever D. The actuating part 54 of the lever D has an inwardly directed support engaging portion 58. The part 58 moves with the bell crank lever D and is rigidly secured thereto by welding or any other suitable fastening means. The operating part 52, or handle, of the lever D extends through a slot 60 formed in the end wall 18 of the casing B. A finger engaging piece 62 is mounted upon the outer free end of the lever D. The portion 58 is adapted to engage the under side of the support 46 as clearly shown in Figure 5 of the drawings. The arrangement of the bell crank lever D and the support 46 is such that when the parts are in the position shown in solid lines in Figure 5, a slice of bread may be supported upon the support 46. Movement of the bell crank lever D to the position shown by dotted lines in Figure 5 will cause the support to swing upon its pivot and assume an inclined position. The purpose of providing a support movable from a horizontal to an inclined position will be hereinafter more fully set forth.

A timing mechanism E is suitably supported on the under surface of the base 10 and is spaced slightly therefrom by insulating washers or the like 64. The timing mechanism E is of the ordinary construction and forms no part of my present invention, except in the combination as one of the elements thereof. The timing mechanism E includes a time control lever 66 adapted to project through a slot 68 formed in the base A. The lever 66 may be shifted to various positions and thus the length of time for operation of the timing mechanism is governed and controlled. The timing mechanism also includes an actuator 70 which is designed for engagement with the actuating part 54 of the lever D. The lever D projects down through a slot 72 formed in the base 10 of the support A.

A pair of handles 74 of any suitable design may be mounted upon the toaster base.

*Practical operation*

The practical operation of my toaster consists in first adjusting the lever 66 to any predetermined position for governing the length of time the bread is to be toasted. The bell crank lever D is then manipulated by moving it from the position shown in solid lines in Figure 2 to the position shown in solid lines in Figure 5 of the drawings. The part 54 of the lever D engages the actuator 70 of the timing mechanism E. The timing mechanism then begins to function. Movement of the lever D as just described will cause the support 46 to assume a horizontal position. A slice of bread is then inserted through the opening 20 of the casing B. The timing mechanism continues to function and the actuator 70 thereof will move in the direction indicated by the arrow 76. The actuator 70 engages the part 54 and causes the lever to return to its original and starting position.

Movement of the lever D likewise carries with it the part 58 and thus the support 46 will be permitted, due to its own weight and the weight of the bread thereon, to drop by gravity and to assume the position shown in Figure 2 of the drawings. The support, when inclined, serves as a guide or run-way for permitting the slice of bread to slide thereon and thereby out of the toaster.

It will, of course, be understood, that the heating elements on both sides of the toast are in operation at all times. It will be noted further that the toast is ejected from the casing and from between the heating elements through the same opening through which it was inserted initially into the toaster The length of time it takes the timing mechanism to trip the lever D and thus the support 46 is strictly governed by the position of the lever 66. If it is desired to remove the toast from the toaster before complete operation of the timing mechanism, this can be accomplished by engaging the lever D and raising it upwardly, thus causing the support 46 to assume an inclined position and permitting the toast to be ejected from the toaster. If it should be found that the slice of toast has not been toasted a sufficient amount, irrespective of the timing mechanism, it may be re-inserted into the toaster and the bell crank lever D moved downwardly whereupon the toast will be supported upon the support 46.

The timing mechanism will serve to trip the lever D and cause the toast to be ejected from within the casing at the proper time. It will be seen that I have provided a mechanism which can be manually operated for ejecting the toast from the toaster, even though the mechanism may have been set for operation at a predetermined time.

The inclined grid wires 42 tend to assist in guidingly supporting the slice of bread when it is sliding out of the toaster by gravity. I have found from actual experience that my toaster operates efficiently and that the angle of the support 46 is all that is necessary to cause the bread to be slid from the toaster and away from the heating elements. Permitting the bread to be removed from between the heating elements enables me to have a toaster wherein the heat is retained at its maximum at all times so that the toasting operation will be uniform.

It will be noted that the ejecting mechanism has no connection with the control of the heating elements themselves.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A bread toaster comprising a casing having an open end, heating means within said casing and adjacent the sides thereof, a rectangular support for a slice of bread having a transverse pivot, said support being normally arranged in horizontal position during the toasting operation and swinging about its pivot to an inclined position after completion of the toasting operation for discharging a slice of bread longitudinally off said support and endwise through said open end and grid wires in said casing arranged substantially parallel with said support when so inclined.

2. A bread toaster comprising a casing, heating means within said casing, and a movable support within said casing for supporting a slice of bread, said support being normally arranged in horizontal position for the toasting operation, timing mechanism operatively connected with said support for causing said support to assume an inclined position after completion of the toasting operation and grid wires in said casing arranged substantially parallel with said support when so inclined.

3. A bread toaster comprising a casing, spaced heating elements within said casing and normally horizontal means positioned between said heating elements for supporting a slice of bread to be toasted, grid wires between the heating elements and the slice of bread, said means being rectangular and pivotally supported on a pivot arranged transversely thereof, means for causing said normally horizontal means to swing downwardly about its pivotal axis and assume an inclined position after completion of the toasting operation, said grid wires being inclined in substantially parallelism with said means in its inclined position, said means and said grid wires serving as a guide for allowing the slice of bread to slide endwise away from the heating elements.

4. A bread toaster comprising a casing having an open end, heating means within said casing and adjacent the sides thereof, a rectangular support within said casing for a slice of bread, said support being normally arranged in horizontal position during the toasting operation and in longitudinally inclined position after completion of the toasting operation for discharging a slice of bread longitudinally off said support and endwise through said open end and grid wires in said casing arranged substantially parallel with said support when so inclined.

ERNEST S. JOHNSON.